United States Patent [19]

Stachiw

[11] 4,355,867
[45] Oct. 26, 1982

[54] SPHERICAL SEGMENT INSERTION APPARATUS

[75] Inventor: Jerry D. Stachiw, El Cajon, Calif.

[73] Assignee: The United States of America as represented by the Secretary of the Navy, Washington, D.C.

[21] Appl. No.: 222,114

[22] Filed: Jan. 2, 1981

[51] Int. Cl.³ .............................................. G02B 7/02
[52] U.S. Cl. .................................... 350/319; 350/67; 403/197
[58] Field of Search .................. 350/319, 67; 403/197, 403/194; 285/189

[56] References Cited

U.S. PATENT DOCUMENTS

| | | | |
|---|---|---|---|
| 3,839,109 | 10/1974 | Horn | 156/629 |
| 3,929,533 | 12/1975 | Horn | 156/71 |
| 4,150,875 | 4/1979 | Stachiw et al. | 350/319 |
| 4,213,029 | 7/1980 | Endicott et al. | 350/319 |

Primary Examiner—Jon W. Henry
Attorney, Agent, or Firm—Beers Robert F.; Ervin F. Johnston; James O. Skarsten

[57] ABSTRACT

An apparatus is provided for enabling selected structure to be joined to a spherical segment, such as a segment employed as a lens, viewing port or radiation transmissive housing. The apparatus includes a structure support component which is insertable into an aperture through the segment, the aperture being circumscribed by a frustoconical bearing surface, and the support component being provided with a frustoconical seating surface which matches the bearing surface of the aperture. A retaining component positioned inside the spherical segment is provided to selectively secure the support component within the aperture, so that the frustoconical bearing and seating surfaces are maintained in abutting relationship. Several components of a compliant nature are selectively positioned between the support means and various portions of the spherical segment, proximate to the aperture, to seal the spherical segment from external pressure, which may become substantial.

7 Claims, 4 Drawing Figures

SPHERICAL SEGMENT INSERTION APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to apparatus for enabling structure to be attached to or to penetrate through a spherical segment formed of brittle material, such as glass, ceramic or germanium. More particularly, the invention pertains to apparatus of the above type which is to be employed with lenses, viewing ports or other spherical segments formed of brittle, radiation transmissive material. Even more particularly, the invention pertains to apparatus of the above type for enabling structure of a metallic nature to be attached to or to penetrate through a spherical segment of the above type which may be subjected to extreme external pressures. Hereinafter, for simplicity of description, the term "lens", or "spherical segment lens", shall be employed to generically refer to any lens, viewing port, window or like structure which is configured in the form of a portion of a sphere, and is fabricated from brittle, light transmissive material.

Spherical segment lenses of the above type are being increasingly employed aboard underwater and airborne platforms to protect sensing equipment, transmitting equipment, and personnel from the environments in which the platforms are respectively deployed. If used aboard underwater platforms, such lenses may be subjected to extreme external hydrodynamic pressures. If used aboard an airborne platform moving at a very high velocity, such lenses may be subjected to aerodynamic pressures which are likewise extreme. An example of a spherical segment lens employed aboard an underwater platform is provided by U.S. Pat. No. 4,150,875, issued Apr. 24, 1979, one of the inventors thereof being the inventor of the present invention. Such patent discloses the use of a hyperhemispherical lens to house electro-optical viewing equipment which is to be mounted upon a submarine vessel, so that the lens, and structure associated therewith, must be capable of resisting extreme external pressures.

In the past, it was considered to be unfeasible to pass metallic structure, such as hydraulic or electrical lines, through a spherical segment lens formed of brittle material if the lens was to be employed in a high pressure environment. It was thought that such design would result in fracture of the lens when the pressure load was applied thereto, or that the joint between a metallic structure and a lens formed of brittle material could not be sealed sufficiently against the high pressure of the environment. For the same reasons, it was considered to be unfeasible to mechanically join a metallic structure to the outer or inner surface of a lens in a high pressure environment, where it was desired to secure the structure and lens together in a bond which had more strength than could be achieved by using an adhesive material.

Because of the above limitations, it was thought that in order to firmly mount metallic structure adjacent to a lens in a high pressure environment, externally to the lens, some sort of supporting frame had to be positioned about the lens exterior. However, in employing such external supporting frame, it was found that the field of view through the lens, of an observer or electrooptic equipment, could be significantly diminished. Also, electric cables for providing power and communications to equipment externally mounted upon the lens had to be routed around the lens exterior, further diminishing field of view. If the lens was employed upon an underwater vessel, such cables could be subjected to strumming, vibration and flopping action, due to vortex shedding or waveslap, and would often be damaged or destroyed.

In like manner, to mount metallic structure or equipment near the inner surface of a lens, a suitable supporting frame had to be provided inside the lens. In addition to diminishing field of view, such frame competed for usable space inside the lens, which may be very limited.

In the present invention, an apparatus is employed for enabling selected metallic structure to penetrate through a spherical segment lens, formed of brittle material, and also to be firmly attached to either the external or internal surface of the lens, without diminishing the capability of the lens to withstand extreme external pressures. In addition, the apparatus enables different types of equipment or structure to be readily secured to either the inner or outer surface of the lens, or to be passed through an aperture in the lens.

SUMMARY OF THE INVENTION

In the present invention, an apparatus is provided for enabling selected structure to be joined to a spherical segment formed of brittle, radiation transmissive material, the apparatus including means for supporting the structure, the supporting means being insertable into an aperture through the spherical segment. The aperture is circumscribed by a frustoconical bearing surface, and the supporting means is provided with a frustoconical seating surface, which matches the frustoconical bearing surface. Means are provided for selectively retaining the supporting means in the aperture so that the bearing surface of the spherical segment and the seating surface of the supporting means are maintained in abuttable relationship, and compliant means, positioned between the supporting means and the spherical segment, seals the spherical segment from external pressures when the retaining means is operable, i.e., is acting to maintain the abuttable relationship between the bearing and seating surfaces.

Preferably, the spherical segment comprises a lens, window, or housing for electro-optical viewing equipment, and is formed of material which is transmissive to radiation of selected frequencies, such as glass or germanium. The seating surface of the supporting means comprises a metallic material, and the apparatus includes a frustoconical gasket which is positionable between the bearing surface and the seating surface to resist wear therebetween, when the lens is subjected to substantial external pressures. Preferably also, the supporting means includes an annular edge which abuts a portion of the outer surface of the lens, when the supporting means is inserted into the aperture, and the compliant means includes an external O-ring which is compressed between the annular edge and such outer portion when the retaining means is operable.

In a preferred embodiment of the invention, the retaining means comprises means for applying force to an annular portion of the inner surface of the lens when the retaining means operates to maintain the bearing and seating surfaces in abuttable relationship, an inner gasket being positioned between the retaining means and the annular portion of the inner surface. The supporting means in such preferred embodiment comprises a lens penetration component for enabling the abuttable relationship between the seating and bearing surfaces to be maintained, while allowing selected structure to be detached from the lens. The supporting means further comprises a number of structure adapted core components, each of the structure-adapted core components comprising means joined to a particular structure or piece of equipment for enabling such particular structure or equipment to be removably joined to the lens penetration component.

OBJECTS OF THE INVENTION

An object of the present invention is to enable metallic structure to penetrate through a spherical segment lens formed of brittle material, or to be securely attached to the internal or external surface thereof, without diminishing the ability of the lens to resist substantial external pressures.

Another object is to enable selected metallic structure to pass through or be mechanically attached to a spherical segment lens formed of selected radiation transmissive material, such as glass or germanium, where the lens may be subjected to substantial hydrostatic or aerodynamic loading.

Another object is to tightly seal the joint between a lens and metallic structure penetrating therethrough, or attached thereto, against both an internal vacuum and a high external pressure.

Another object is to provide a seal for a lens-metallic structure assembly of the above type, which increases in strength as external pressure upon the lens is increased.

Another object is to provide a lens-structure assembly of the above type wherein exposure to extreme external pressures do not generate tensile stresses in the portion of the lens which is adjacent to the structure, or contact stresses upon a frustoconical bearing surface, which passes through the lens.

Another object is to enable various types of structure or equipment to be readily attached to or to be passed through a spherical segment lens, while minimizing the amount of precision machining which must be performed to enable a frustoconical bearing surface of a lens aperture, and a frustoconical seating surface of a metallic structure support component, to be matched to within a very close tolerance.

These and other objects of the invention will become more readily apparent from the ensuing specification when taken together with the drawings.

DETAILED DESCRIPTION OF THE PREFERRED EMBODIMENT

Figure 1:
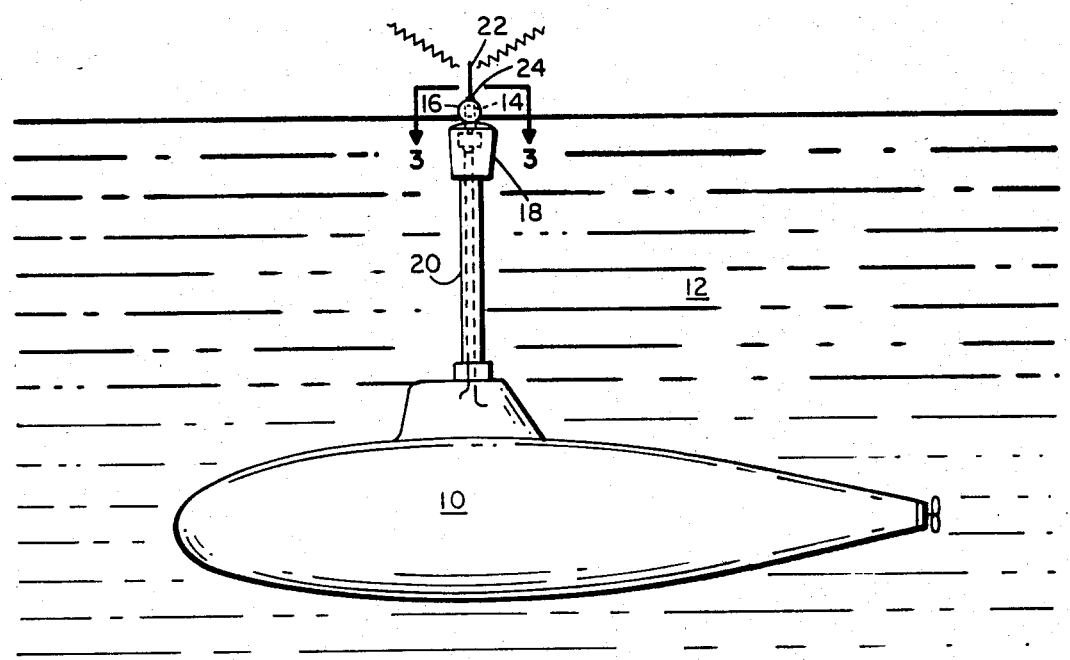
FIG. 1 is a perspective view which shows an embodiment of the invention employed by a submersible vessel in a marine environment.

Referring to FIG. 1, there is shown a submarine or like submersible vessel 10 operating in a marine environment 12. Electrooptical viewing equipment 14, which is capable of scanning or viewing through an azimuth angle of 360°, is enclosed in and protected from environment 12 by a hyperhemispherical housing or lens 16, which is joined to a mounting 18 in a manner described in aforementioned U.S. Pat. No. 4,150,875. Mounting 18 is joined to vessel 10 by means of a mast 20. Lens 16 is formed of a brittle material, such as glass or germanium, which is respectively transmissive to radiation of visible light or infrared frequencies.

Referring further to FIG. 1, there is shown an antenna 22 mounted upon hyperhemispherical lens 16 by means of a mounting or supporting assembly 24, which is designed according to the principles of the present invention. Assembly 24 must be capable of firmly securing antenna 22 to the external surface of lens 16, in a selected orientation. Assembly 24 must also permit an electrical conducting path to pass through lens 16, between antenna 22 and equipment contained inside lens 16 or mounting 18, to enable antenna 22 to either transmit or receive RF signals. At the same time, assembly 24 must form a seal with lens 16 which is capable of withstanding extreme hydrostatic pressures, which are imposed upon lens 16 when vessel 10 submerges to great depths.

Figure 3:
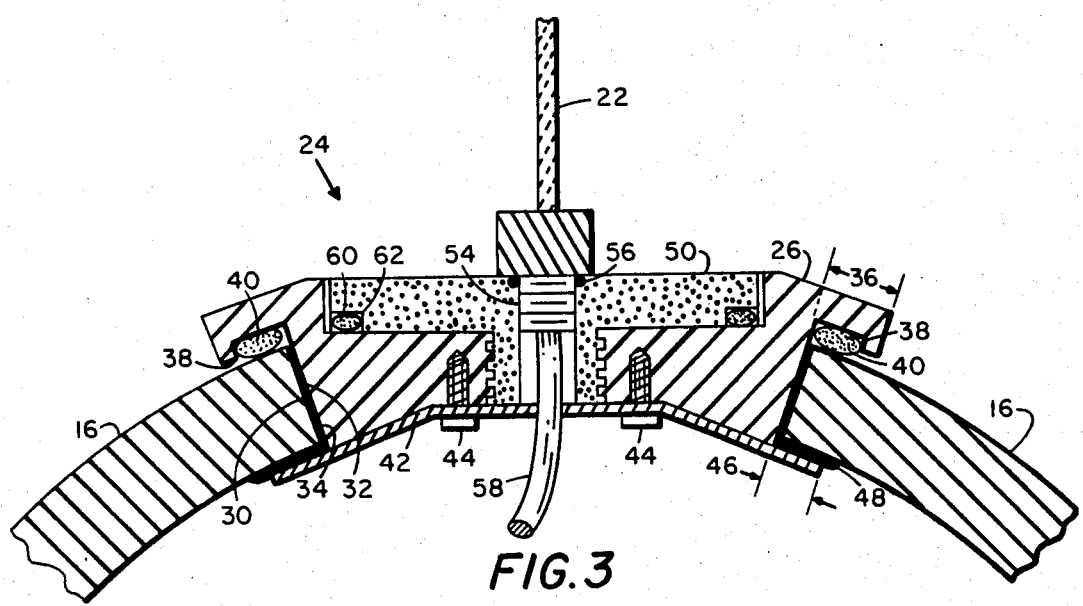
FIG. 3 is a sectional view of the embodiment of FIG. 1, taken on line 3—3 of FIG. 1.
Figure 2:
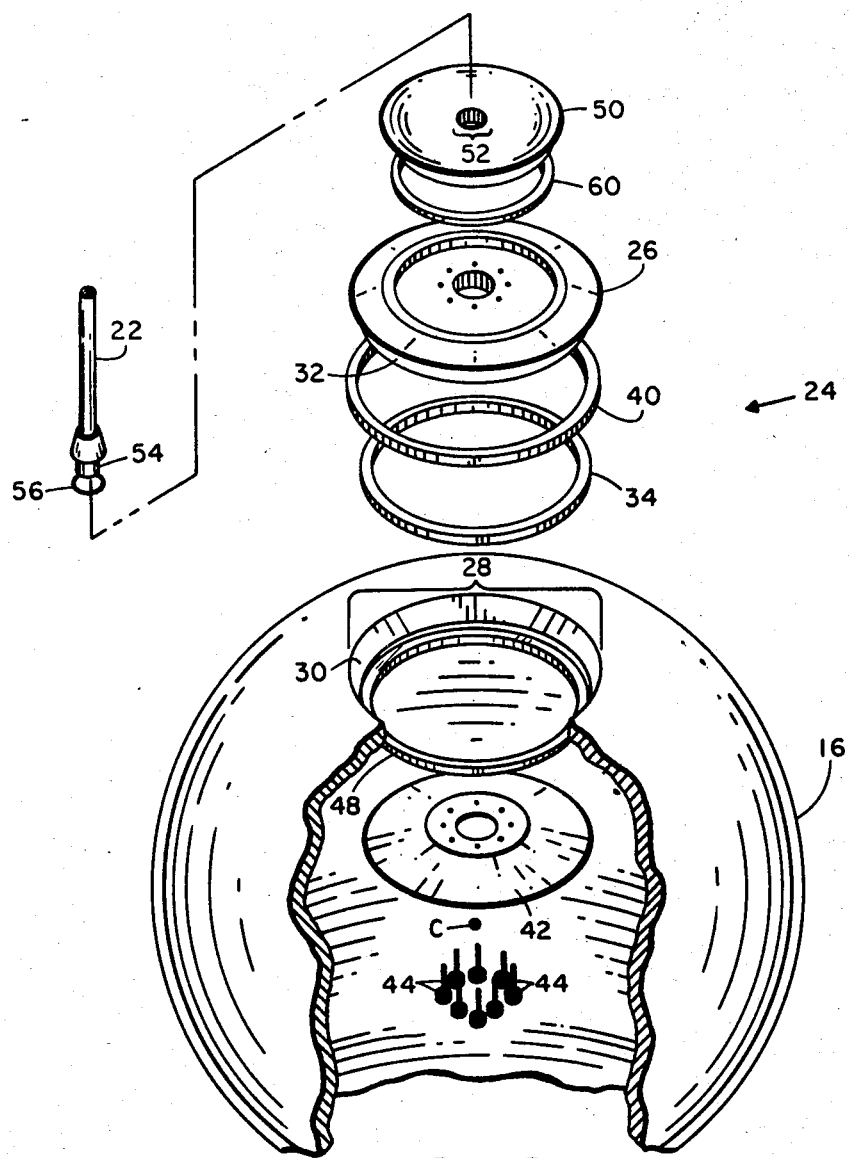
FIG. 2 is an exploded isometric view of the embodiment of FIG. 1, a portion thereof being broken away.

Referring to FIGS. 2 and 3 in conjunction, there are shown respective components of supporting assembly 24. One such component, a lens penetration component 26, formed of selected metallic material, is insertable into an aperture 28 which passes through hyperhemispherical lens 16, at the position thereupon at which it is desired to locate antenna 22. Surface 30 of lens 16, which surrounds or circumscribes aperture 28, lies upon a spherical angle $\alpha$ having an apex at point C, which is concentric with the geometric center of hyperhemispherical lens 16. Surface 30 thereby comprises a frustoconical surface, and is capable of bearing or supporting penetration component 26. Component 26 is provided with a frustoconical seating surface 32 configured to match frustoconical bearing surface 30, to a selected close tolerance, so that bearing surface 30 and seating surface 32 may be brought into very tight, abutting relationship. A frustoconical gasket 34 is positioned therebetween, to resist wear between the bearing and seating surfaces when such surfaces move with respect to another. Movement occurs when the external pressure upon lens 16 is varied, as a result of the difference in flexure coefficients of the brittle and metallic materials of which lens 16 and component 26 are respectively formed.

To insure a very tight seal between lens 16 and penetrating component 26, penetrating component 26 is provided with an annular edge portion 36, which is in adjacent relationship with a portion of the outer surface of lens 16 when component 26 is inserted into aperture 28. The underside of edge portion 36 is provided with an annular channel or groove 38, into which an O-ring 40 is fitted. Consequently, when component 26 is inserted into aperture 28, an increase in the pressure of environment 12 adjacent to lens 16 increases the inward force upon component 26, whereby compression of O-ring 40 is increased. It may be seen therefrom that supporting assembly 24 is structured so that an increase in the external pressure upon lens 16 and assembly 24 generates a corresponding increase in the sealing of the joint between lens 16 and penetration component 26.

In order to retain penetrating component 26 within aperture 30, supporting assembly 24 includes an inner retaining ring 42, retaining ring 42 having a curvature which matches the inner curvature of lens 16. Retaining ring 42 and penetration component 26 are joined together by means of bolts or screws 44, so that tightening bolts 44 draws component 26 into aperture 28. Outward movement of ring 42 is resisted by an annular portion 46 of the inner surface of lens 16, an inner gasket 48 being positioned between annular portion 46 and retaining ring 42.

Referring once more to FIGS. 2 and 3 in conjunction, there is shown supporting assembly 24 further including structure-adapted core component 50, which is in the form of a disk and is penetrated by a circular aperture 52. The upper portion of aperture 52 of core component 50 is threaded, to enable a threaded portion 54 of antenna 22 to be fixably retained in aperture 52. By forming both core component 50 and antenna 22 of similar metallic material, a threaded joint therebetween may be made capable of resisting extreme hydrostatic or other external pressure by placing an O-ring 56 therebetween. It will be noted that conductors 58 joined to antenna 22 are enabled to pass through aperture 52 and be connected, for example, to RF signal transmitting or receiving equipment mounted upon viewing equipment 14.

Core component 50 is adapted for seating into a recessed portion of penetration component 26. Components 50 and 26 are fixably joined together, either by bolts 44 or by matching threads placed on adjacent edges of components 50 and 26. An O-ring 60 is placed in an annular groove 62 on the underside of core component 50 to tightly seal the joint between components 50 and 26 against extreme external pressures.

Figure 4:
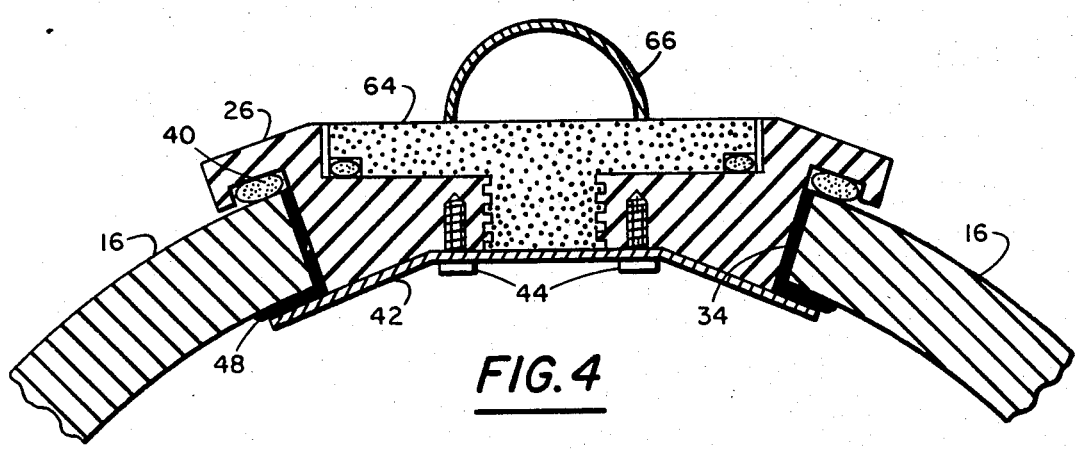
FIG. 4 is a perspective view showing a modification of the embodiment of FIG. 1.

Referring to FIG. 4, there is shown a structure-adapted core component 64 seated in the aforementioned recessed portion of lens penetration component 26, core component 64 being very similar to core component 50. Unlike core component 50, however, core component 64 is completely solid. Such design is provided to enable structure such as a lifting eye 66 66 to be welded or otherwise firmly attached to core component 50, and thereby to the outer surface of lens 16. Alternatively, structure can be affixed to the inner surface of lens 16 by attaching it to core component 64.

In another modification of the invention, a heating element may be contained in frustoconical gasket 34, to prevent ice formation upon lens 16 when vessel 10 operates in the Arctic or other cold water environments. To controllably remove condensation or other view-obstructing substance from the outer or inner surface of lens 16, a lens cleaning device may be affixed to the outer or inner side of core component 64, respectively.

Other modifications and variations of the present invention are possible in the light of the above teachings, and it is therefore understood that within the scope of the disclosed inventive concept, the invention may be practiced otherwise than specifically described.

What is claimed is:

1. An apparatus for enabling selected structure to be joined to a spherical lens, said lens formed of material which is transmissive to radiation of selected frequencies, said apparatus comprising:
   a lens penetration component, said component being insertable into an aperture through said spherical lens, said aperture being circumscribed by a frustoconical bearing surface, and said lens penetration component being provided with a metallic frustoconical seating surface which matches said frustoconical bearing surface;
   means for selectively retaining said lens penetration component in said aperture so that said bearing surface of said spherical lens and said seating surface of said lens penetration component are maintained in abuttable relationship while allowing said selected structure to be detached from said lens;
   a frustoconical gasket which is positionable between said bearing surface and said seating surface for resisting wear between said bearing surface and said seating surface when said lens is subjected to substantial external pressure;
   compliant means positioned between said lens penetration component and said spherical lens for sealing said spherical lens from external pressures when said retaining means maintains said abuttable relationship between said bearing surface and said seating surface;
   a number of structure-adapted core components, each of said structure-adapted components comprising means joined to a particular structure for enabling said particular structure to be selectively joined to and detached from said lens penetration component;
   means are provided for removably seating one of said structure-adapted core components in a seating recess which is provided in said lens penetration component; and
   said supporting means includes means for sealing the joint between said lens penetration component and a structure-adapted core component seated in said recess against extreme external pressures.

2. The apparatus of claim 1 wherein:
   one of said structure-adapted core components comprises means provided with an aperture of selected dimensions for enabling structure to pass through said lens without diminishing the capability of said lens to resist said extreme external pressures.

3. The apparatus of claim 1 wherein:
   one of said structure-adapted core components comprises means for rigidly attaching selected structure to the outer surface of said lens without diminishing the capability of said lens to resist said extreme external pressures.

4. The apparatus of claim 1 wherein:
   one of said structure-adapted core components comprises means for rigidly attaching selected structure to the inner surface of said lens without diminishing the capability of said lens to resist said extreme external pressures.

5. The apparatus of claim 1 wherein:
   one of said structure-adapted core components comprises means for joining a lens cleaning device to a surface of said lens to enable view-obstructing material to be controllably cleared from said lens surface.

6. An apparatus for enabling selected structure to pass through a hyperhemispherical viewing lens formed of selected brittle, radiation transmissive material when the hyperhemispherical viewing lens is brought into a selected underwater environment of very high pressure comprising:
   metallic penetration means for providing a passage of selected dimensions between said environment and the interior of said hyperhemispherical viewing lens, said penetration means having a seating surface abutting said lens which lies on a spherical angle having an apex which is situated at the geometric center of said hyperhemispherical viewing lens;

first compliant means positioned between said penetration means and the outer surface of said lens for sealing the joint between said penetration means and said lens with a sealing strength which increases as the pressure of said environment increases;

metallic core means detachably joined to said penetration means, said core means provided with an aperture of selected dimensions which is traversable by said selected structure;

second compliant means positioned between said penetration means and said core means for sealing the joint between said penetration means and said core means with a sealing strength which increases as the pressure of said environment increases; and retaining means contained within said hyperhemispherical viewing lens and joined to said penetration means for retaining said seating surface of said penetration means in close abutting relationship with said lens wherein:

said first compliant means comprises a first O-ring compressed between said penetration means and the outer surface of said lens;

said second compliant means comprises a second O-ring compressed between said penetration means and said core means; and said core means comprises a disc-shaped core component which is removably seatable in a recessed portion of said penetration means, said core component having a circular aperture passing through its center.

7. The apparatus of claim 6 wherein said structure comprises linear metallic structure, and wherein:

said core component comprises means provided with an aperture which is selectively sized to enable said linear structure to pass through said selectively sized aperture; and third compliant means are positioned between said linear structure and said core component to seal the joint between said linear structure and said core component against the pressures of said environment.

* * * * *